US008761382B2

(12) United States Patent
Pollitt

(10) Patent No.: US 8,761,382 B2
(45) Date of Patent: Jun. 24, 2014

(54) TELEPHONE CALL PROCESSING METHOD AND APPARATUS

(75) Inventor: Alex Pollitt, Middlesex (GB)

(73) Assignee: Metaswitch Networks Ltd, Enfield (GB)

( * ) Notice: Subject to any disclaimer, the term of this patent is extended or adjusted under 35 U.S.C. 154(b) by 994 days.

(21) Appl. No.: 12/126,826

(22) Filed: May 23, 2008

(65) Prior Publication Data

US 2009/0022283 A1    Jan. 22, 2009

Related U.S. Application Data

(63) Continuation of application No. PCT/EP2006/068913, filed on Nov. 24, 2006.

(30) Foreign Application Priority Data

Nov. 24, 2005 (GB) .................................... 0523919.9

(51) Int. Cl.
*H04M 3/00* (2006.01)
(52) U.S. Cl.
USPC ................................ 379/373.01; 379/373.02
(58) Field of Classification Search
CPC ..... H04M 3/487; H04M 7/006; H04M 1/642; H04M 3/42059; H04M 3/42348; H04M 3/42374; H04M 7/129; H04M 2201/42; H04M 2203/2072; H04M 2203/353; H04M 2242/15; H04M 3/436; H04M 7/0024; H04M 3/42042; H04M 3/4211; H04L 65/1006
USPC ................. 379/68, 142.01, 207.16, 373.01, 379/373.02, 373.03, 114.13
See application file for complete search history.

(56) References Cited

U.S. PATENT DOCUMENTS

| 4,811,382 A | 3/1989 | Sleevi |
| 6,385,308 B1 | 5/2002 | Cohen et al. |
| 7,813,490 B2 * | 10/2010 | DeMent et al. .......... 379/221.03 |

(Continued)

FOREIGN PATENT DOCUMENTS

| GB | 2318702 | 4/1998 |
| GB | 2343084 | 4/2000 |

(Continued)

OTHER PUBLICATIONS

International Search Report dated May 2, 2007 for International Application No. PCT/EP2006/068913.

(Continued)

*Primary Examiner* — Amal Zenati
(74) *Attorney, Agent, or Firm* — EIP US LLP

(57) ABSTRACT

This invention provides methods and apparatus for providing customized prior-to-answer and in-call media playback telephony services. The services allow for playback of customized media content to calling parties in the form of customized ringback tones, engaged tones, call holding, call transfer tones and other content such as pre-recorded announcements. The media content for playback is stored in equipment associated with subscribers and playback of the media content is originated from the subscriber equipment. The invention allows subscribers to give their telephony services a personal touch as they can choose different items of media content for playback to different calling parties. As the media content is stored on subscriber equipment local to subscribers, no additional network resources such as data storage and data processing facilities are required.

41 Claims, 7 Drawing Sheets

(56) References Cited

U.S. PATENT DOCUMENTS

| | | | |
|---|---|---|---|
| 7,830,864 B2 * | 11/2010 | Li | 370/352 |
| 7,889,853 B2 * | 2/2011 | Sutcliffe | 379/207.16 |
| 2004/0081304 A1 | 4/2004 | Lee | |
| 2004/0174983 A1 * | 9/2004 | Olschwang et al. | 379/377 |
| 2004/0266399 A1 | 12/2004 | Simpson | |
| 2006/0182247 A1 * | 8/2006 | Batni et al. | 379/189 |

FOREIGN PATENT DOCUMENTS

| | | |
|---|---|---|
| GB | 2404522 | 2/2005 |
| GB | 2406464 | 3/2005 |
| WO | WO 01/06679 | 1/2001 |
| WO | WO 03/005686 | 1/2003 |
| WO | WO 03/071820 | 8/2003 |
| WO | WO 2004/054282 | 6/2004 |
| WO | WO 2005/006724 | 1/2005 |
| WO | WO 2005/048571 | 5/2005 |

OTHER PUBLICATIONS

Search Report dated Mar. 13, 2006 for Application No. GB0523919.9.

Search Report dated Jun. 28, 2006 for Application No. GB0523919.9.

* cited by examiner

TELEPHONE CALL PROCESSING METHOD AND APPARATUS

CROSS-REFERENCE TO RELATED APPLICATIONS

This application is a continuation, under 35 U.S.C. §120, of International Patent Application No. PCT/EP2006/068913, filed Nov. 24, 2006, under the Patent Cooperation Treaty (PCT), which was published by the International Bureau in English on May 31, 2007, with International Publication Number WO 2007/060227, which designates the United States and claims the benefit of GB Application No. 0523919.9, filed Nov. 24, 2005. All above-referenced prior applications are incorporated by reference herein in their entirety and are hereby made a portion of this specification.

BACKGROUND OF THE INVENTION

1. Field of the Invention

This invention relates to a method and apparatus for providing customized media playback telephony services. In particular, but not exclusively, the invention relates to the provision of prior-to-answer media playback services such as customized ringback tones, engaged tones and other content such as pre-recorded announcements played before a call is answered.

The invention also relates to in-call telephony services, providing customized media playback after a call has been answered, for example customized call holding and call transfer tones.

2. Description of the Related Technology

Prior-to-answer telephony services provide information to a telephony service user before a call is answered. This information may come in the form of a ringback tone, an engaged tone, or a pre-recorded announcement which all serve to indicate to a calling party that the call is being processed. However, the information provided is typically the same to all users of the telephony services. Further, such services do not allow a called party to have any influence on how their individual prior-to-answer telephony services will be presented to calling parties.

International patent application WO A 03/071820 relates to a method and apparatus for providing a sound chosen by a called subscriber instead of ringback tone to a calling subscriber. If a call is received, a terminating exchange requests a trunk connection to a sound database server based on the first information on whether or not to replace a ringback tone and the second information on a route to the sound database server that are received from a home location register (HLR), and provides a called subscriber identification for the sound database server. Then, the sound database server searches its database for a sound specified by the called subscriber, and provides the found sound for the calling subscriber instead of a conventional ringback tone via the terminating exchange connected through a trunk. Through this sequential procedure of network elements, a calling subscriber can hear a sound specified by a called subscriber instead of a standard ringback tone. However, operating a sound database server can be a significant additional cost to the network provider. Further, the selection of ringback tones stored in the sound database server is limited.

International patent application WO A1 03/005686 describes a system for providing personal audio alert messages (PAAM) to a called party and a calling party during a call connection. In response to a call origination by the calling party, a PAAM database may be queried. One or more PAAM strings may be received from a database in response to the query and used to provide PAAM messages to the called and/or calling parties. In the case of prior-to-answer, the system requires specific network-based prior-to-answer apparatus in order to provide PAAM messages back to a calling party.

It would be desirable to provide an improved method and apparatus for providing customized prior-to-answer telephony services.

SUMMARY OF CERTAIN INVENTIVE ASPECTS

According to a first aspect of the present invention, there is provided a method for providing customized prior-to-answer services in a telephony service using the Session Initiation Protocol (SIP), said method comprising the steps of receiving SIP signaling information relating to a first incoming call directed to a subscriber from a calling party; transmitting a SIP signaling message indicating that media content is to be transmitted to said calling party prior to the incoming call being answered; and beginning playback of an item of media content to said calling party whilst the call is in a prior-to-answer signaling state, wherein said item of media content is stored in subscriber equipment associated with said subscriber, and said playback is originated from said subscriber equipment.

Hence the present invention provides prior-to-answer telephony services that can be customized by a subscriber using content stored on their own equipment. This allows a subscriber to give their prior-to-answer telephony services a personal touch as the subscriber can choose an item of media content for playback to a calling party. As the media content is stored on subscriber equipment local to the subscriber, no additional network resources such as data storage and data processing facilities are required. The only limit to the number and variety of items of media content that the subscriber can use to customize their prior-to-answer telephony services is determined by the amount of data storage the subscriber has locally at their disposal. This avoids network operators having to provide such resources, which will mean that such services can be provided at a lower cost than if all subscribers were to store their items of media content centrally in the network. Administration of these prior-to-answer telephony services will thus be much simplified on the part of the network operator.

It is noted that various types of subscriber equipment such as voicemail systems, interactive voice response (IVR) systems etc., which are typically tightly coupled to the call terminating equipment, have the capability to play back recorded media content, such as voice messages. However, these prior art devices are only designed to play back after an incoming call has been answered, and not prior-to-answer.

In one or more embodiments, said received signaling information may comprise an incoming call request, and may comprise the steps of transmitting an incoming call request onward from said subscriber equipment, receiving a ringing indication at said subscriber equipment in response to the transmission, and beginning said playback in response to receiving said ringing indication.

In other embodiments, the method may include receiving signaling information relating to a further incoming call to be directed to said subscriber from a further calling party, beginning playback of a further item of media content to said further calling party before said further incoming call is answered, wherein said further item of media content is stored in said subscriber equipment, and said playback of said further item of media content is originated from said subscriber equipment. Therefore, a subscriber can choose different items of media content to be played back to different calling parties.

The method may also provide for selecting an item of media content to play back to a calling party, said selection being dependent on a context related to an incoming call. A subscriber can thus customize a prior-to-answer telephony service such that which item of media content is played back to which calling party may depend on the context of the call. This context may for example involve one or more of the identity of the calling party, the time at which the incoming call occurs, the location of the subscriber, and/or the location of the calling party.

In some additional embodiments, the method may include terminating the playback of an item of media content when said subscriber answers an incoming call. Hence when the call is answered by the subscriber, the prior-to-answer service is terminated and a two-way telephone call can be conducted in the usual manner.

The subscriber equipment may also comprise a first subscriber device and a second subscriber device, wherein said first subscriber device stores said item or items of media content and said second subscriber device is used to answer an incoming call. The second subscriber device may take the form of a telephone connected to said telephony service network, wherein said telephone is for example an analogue telephone or a packet-switched telephone. The first subscriber device may be one of a personal computer, a laptop, a mobile telephone, a personal digital assistant and/or an audio playback device such as a portable music player. The playback of an item of media content may comprise a ringback tone content. If the subscriber is already conducting a telephone call when another call is incoming, engaged tone content may be played back to the calling party.

The tone content may include audio music content and/or voice announcement content. Hence the items of media content played back to the calling party before the incoming call is answered may include audio music content and/or include a predetermined voice announcement message.

In some embodiments, the method include receiving input from said calling party, in response to said received input, selecting another item of media content, and beginning playback of said another item of media content, wherein said another item of media content is stored in said subscriber equipment and said playback is originated from said subscriber equipment. Hence selection of played back media content may be interactive, depending on input from a calling party. The first subscriber device may comprise a Graphical User Interface (GUI) for managing the items of media content to be played back to calling parties. Hence, management of items of media content can be facilitated by a subscriber operated GUI.

The playback of an item of media content may further involve streaming the item of media content, for example according to the Real-time Transfer Protocol (RTP).

There is further provided apparatus and computer software adapted to perform the method of the present invention.

According to a second aspect of the present invention, there is provided a method for providing customized media playback services in a telephony service using a first subscriber device located at a subscriber location, the telephony service involving a second subscriber device located at said subscriber location, said second subscriber device including telephone functionality allowing said second subscriber device to conduct a telephone call, the second subscriber device having call states controlled by a network-based telephony switching node, said method comprising the steps of receiving signaling information from said network-based telephony switching node at the first subscriber device, said signaling information indicating a call state at said second subscriber device, and in response to receiving said signaling information, initiating playback of an item of media content, wherein said item of media content is stored in a media store associated with said first subscriber device and said playback is initiated from said first subscriber device. Hence, the present invention provides telephony services that can be customized by a subscriber using media content stored on subscriber equipment local to the subscriber. A subscriber may customize their telephony services such that different items of media content can be played back for different call states. If said indicated call state is a ringing state, said playback comprises ringback tone content. Hence if the second subscriber device is in a ringing state, the calling party can be played back customized ringback tone content.

If said indicated call state is an engaged state, said playback may comprise engaged tone content. Hence if the second subscriber device is in an engaged state, the calling party can be played back customized engaged tone content.

In some embodiments, if said indicated call state is an engaged (with call waiting being indicated) state, said playback comprises engaged (with call waiting being indicated) tone content. Hence if the second subscriber device is in an engaged (with call waiting being indicated) state, the calling party can be played back customized engaged (with call waiting being indicated) tone content.

In still additional embodiments, if said indicated call state is a call holding state, said playback comprises call holding tone content. Hence if the second subscriber device is in a call holding state, the calling party can be played back customized call holding tone content.

Is some aspects, said indicated call state may be a call transfer state, said playback comprises transfer tone content. Hence if the second subscriber device is in a call transfer state, the calling party can be played back customized call transfer tone content. According to a third aspect of the present invention, there is provided subscriber equipment for use in providing customized prior-to-answer services in a telephony service using the Session Initiation Protocol (SIP), said subscriber equipment being adapted to store an item of media content, receive SIP signaling information relating to a first incoming call directed to a subscriber from a calling party, transmit a SIP signaling message indicating that media content is to be transmitted to said calling party prior to the incoming call being answered, and begin playback of said item of media content to said calling party whilst the call is in a prior-to-answer signaling state, whereby said playback is originated from said subscriber equipment. According to a fourth aspect of the present invention, there is provided computer software for use in providing customized prior-to-answer services in a telephony service using the Session Initiation Protocol (SIP), said computer software being adapted to receive SIP signaling information relating to a first incoming call directed to a subscriber from a calling party, and begin playback of an item of media content to said calling party whilst the call is in a prior-to-answer signaling state, wherein said item of media content is stored in subscriber equipment associated with said subscriber, and said playback is originated from said subscriber equipment.

According to a fifth aspect of the present invention, there is provided subscriber equipment for use in providing customized media playback services in a telephony service, the telephony service involving a telephony device having call states controlled by a network-based telephony switching node, said subscriber equipment being adapted to store an item of media content in a media store associated with said first subscriber device, receive signaling information from said network-based telephony switching node at the first subscriber device, said signaling information indicating a call state at said telephony device, and in response to said reception of signaling information, initiate playback of an item of media content.

According to a sixth aspect of the present invention, there is provided computer software for use in providing customized media playback services in a telephony service using a first subscriber device, the telephony service involving a second subscriber device, said second subscriber device including telephone functionality allowing said second subscriber device to conduct a telephone call, the second subscriber device having call states controlled by a network-based telephony switching node, said computer software being adapted to receive signaling information from said network-based telephony switching node at the first subscriber device, said signaling information indicating a call state at said second subscriber device, and in response to said reception of signaling information, initiate playback of an item of media content, wherein said item of media content is stored in a media store associated with said first subscriber device and said playback is initiated from said first subscriber device. Further features and advantages of the invention will become apparent from the following description of certain embodiments of the invention, given by way of example only, which is made with reference to the accompanying drawings.

DETAILED DESCRIPTION OF CERTAIN INVENTIVE EMBODIMENTS

Figure 1:
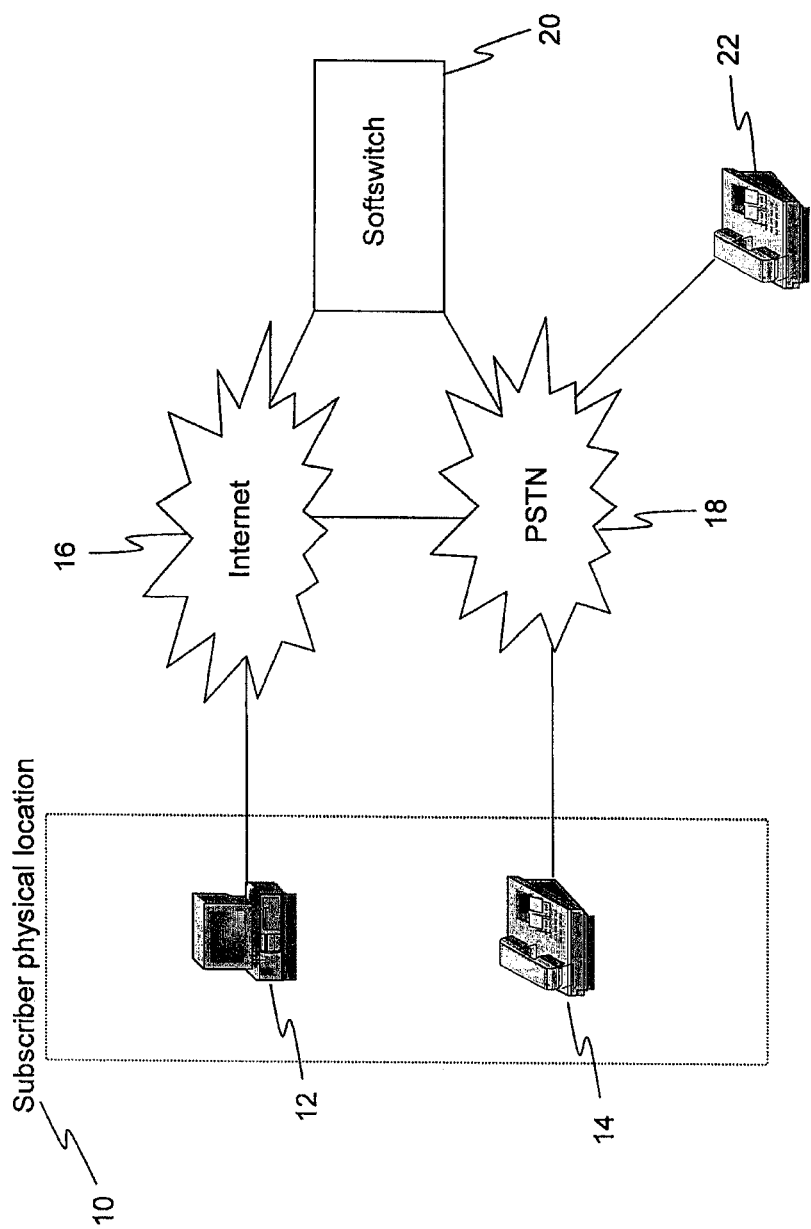
FIG. 1 is an overall system diagram according to an embodiment of the present invention.

An overall system diagram according to an embodiment of the invention is shown in FIG. 1. A subscriber having access to the present invention has two items of subscriber equipment located at his physical location 10, namely a first subscriber device and a second subscriber device. The first subscriber device 12 comprises a data processing device, which in this embodiment is a personal computer (PC). The first subscriber device 12 has an associated media store having data storage capabilities, for example in the form of a hard-disk, and also graphical output capabilities, for example via a monitor. The first subscriber device also runs a software application or applet which is involved in the processing of telephone calls to and from the subscriber. The software also allows the subscriber to manage and customize their telephony service, for example, using a Graphical User Interface (GUI). This software will be referred to herein as a "desktop assistant," although it should be understood that the software can be embodied in various different forms, and may even form part of the operating system of the device in which it operates.

The second subscriber device 14 comprises a telephone, for example an analogue telephone (also known as a 'black phone'). The second subscriber device 14 could alternatively comprise a Voice over Internet Protocol (VoIP) telephone or any other type of telephone. The former analogue telephone case is assumed for further discussion below, but it should be appreciated that the present invention can be applied in other scenarios. The first subscriber device 12 is connected to a packet-based data network such as the Internet 16. The second subscriber device 14 is connected to the Public Switched Telephone Network (PSTN) 18. The PSTN is connected to the Internet via a media gateway entity (not shown) which converts between the different protocols of each network. The media gateway is responsible for handling the media data for calls, the media data being the data packets which contain the payload of the call (e.g. voice data) as opposed to the signaling data packets used for controlling the call. The media gateway typically includes communications switch equipment and operates between a packet-based part of the telecommunications network and the PSTN The telephone company of the subscriber is responsible for operating a Softswitch 20 which is connected to the Internet 16 and the PSTN 18. The Softswitch 20 is responsible for routing calls to and from the subscriber both from the Internet 16 and the PSTN 18. Softswitches are entities or clusters of entities, also known as Media Gateway Controllers (MGCs) and call agents. Softswitches provide the intelligence that controls packet-based telephony services, including the ability to select processes that can be applied to a call, routing for a call within the network based on signaling and subscriber database information, the ability to transfer control of the call to another network element and management functions such as provisioning, fault detection and billing. Softswitches also provide the architecture for enabling conversion between signaling protocols such as the Signaling System #7 (SS7) and the Session Initiation Protocol (SIP).

The International Telecommunications Union standards for telecommunications (ITU-T) body specifies the Signaling System #7 (SS7) protocol for digital exchanges with integrated services. The SS7 protocol provides international data network and signaling protocols that control calls passing through a PSTN. The Internet Engineering Task Force (IETF) Signaling Transport working group has developed the Session Initiation Protocol (SIP) which can be employed to address the transport of packet-based signaling for VoIP calls.

A calling party has an analogue telephone 22 connected to the PSTN 18 with which a telephone call may be made to the subscriber. Alternatively, this telephone 22 may be any other type of telephone, for example an Internet Protocol (IP) telephone in which case it can be connected directly to the Internet 16 and corresponding Softswitch (not shown). The former analogue telephone case is assumed for further discussion below. In this embodiment of the invention, a subscriber is able to set up customized subscriber equipment-originated prior-to-answer telephony services, which will be described below in relation to FIG. 3. Before such services are set up, the prior-to-answer telephony service is provided as a network-originated service, which will be described below in relation to FIG. 2. Note that, in FIGS. 2 and 3 to be described below, solid arrows are used to indicate signaling flows whereas dashed arrows are used to indicate media flows.

Figure 2:
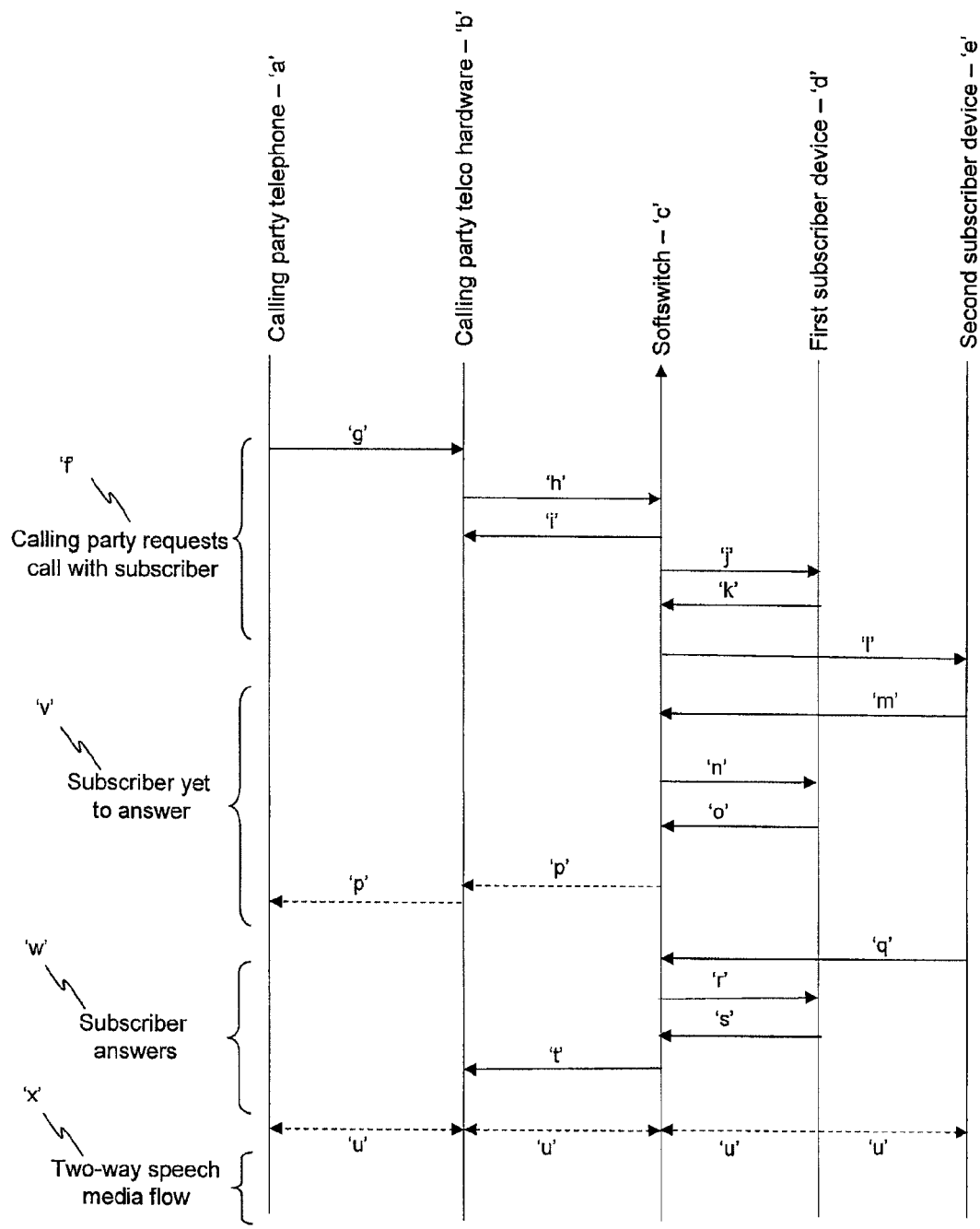
FIG. 2 is a diagram showing the media and signaling flows involved in the provision of network-originated prior-to-answer telephony services according to an embodiment of the invention.

Provision of network-originated prior-to-answer telephony services is now explained for the example of a call initiated by a calling party to a subscriber, with reference to FIG. 2 showing the media and signaling flows involved. A call request begins T when the calling party picks up their telephone 'a' and dials the telephone dialing number associated with the second subscriber device 'e' i.e. the subscribers telephone. A call request 'g' is sent from the calling party's telephone 'a' to the hardware 'b' of the telephone company responsible for their calls. This hardware may be located in or connected to the PSTN and/or the Internet, depending on the type of telephony service the calling party has access to.

The hardware 'b' of the calling party's telephone company then uses an appropriate lookup service in order to find out where to route the call to. A lookup service allows mapping of a telephone number to the telephony hardware or domain name associated with the telephone service of the called party (in this case the subscriber).

Using the information provided by the lookup service, the call request from the calling party is routed 'h' to the telephone company hardware of the subscriber. In this case the subscriber's telephone company hardware comprises a Softswitch 'c' and the switch signaling protocol employed is SIP. Signaling flows between the Softswitch 'c' and the first subscriber device are in the form of SIP messages. The signaling protocol employed could alternatively be the Media Gateway Control Protocol (MGCP) or other suitable signaling protocols. In this example, signaling flows between the Softswitch 'c' and the hardware 'b' of the calling party's telephone company may not be by SIP messages, but in SS7 or another suitable protocol. Information relating to SIP messaging may be translated or encapsulated into the SS7 signals for billing purposes or otherwise, where knowledge of signaling across the network is required.

A trying signal 'i' is sent by the Softswitch 'c' back to the telephone hardware 'b' of the calling party to indicate that an attempt is being made to establish the call. The Softswitch 'c' sends a call request on to the subscriber's first subscriber device 'd' in the form of an invite request message 'j.' The invite request message 'j' contains details of the calling party and the second subscriber device 'e.' In SIP, an invite request message such as this is known as a "100 Invite" message. The Session Description Protocol (SDP) is used to convey information including the type of media involved in the session (here a telephone call) and any addressing required to receive the media, for example an IP address. SDP is a format for session description and is intended for use with different transport protocols as appropriate. In this example, SDP information is conveyed using the SIP transport protocol.

When the desktop assistant in the first subscriber device receives the invite request, it sends an invite message 'k' back to the Softswitch 'c' This invite message 'k' contains the same information as the invite message 'j,' so that the SDP information in invite message 'j' has effectively been passed back to the Softswitch unaltered. In this way the desktop assistant remains in the signaling path without becoming involved with the media path.

The Softswitch then sends an incoming call notification signal T direct to the second subscriber device 'e' using these identification details. When the second subscriber device 'e' receives the notification signal it starts to ring and sends a ringing signal 'm' back to the Softswitch 'c' The Softswitch conveys this information to the desktop assistant in the first subscriber device 'd' in a ringing message 'n,' which acknowledges receipt of this information by sending a ringing message O' back to the Softswitch 'c' In SIP, a ringing message such as this is known as a "180 Ringing" message.

The desktop assistant in the first subscriber device 'd' then updates the status of the second subscriber device 'e' accordingly. This may result in a visual change on the screen of the first subscriber device informing the subscriber that there is an incoming call. A further ringing tone may also be produced by a sound module on the first subscriber equipment 'd,' which is in addition to the ringing tone emitted from the second subscriber device 'e.'

Once the Softswitch 'c' receives the ringing message O,' it proceeds to transmit media content data 'p' to the calling party telephone hardware 'b' which is then sent on 'p' to the calling party telephone 'a.' This transmitted (played back) media content may for example be the well-known telephone "ringing" sound, which when received by the telephone 'a' of calling party indicates to the calling party that the second subscriber device 'e' is ringing, but has not yet been answered. This played back media content is known as a ringback tone since it indicates that the called party telephone is currently ringing. When the subscriber answers the call 'w,' the second subscriber device 'e' sends an answer signal 'q' to the Softswitch 'c' The Softswitch 'c' then sends an OK message 'r' to the desktop assistant in the first subscriber device 'd' informing it that the subscriber has answered the call. In SIP, an OK message such as this is known as a "200 OK" message.

The desktop assistant in the first subscriber device then acknowledges this in an OK message 's' back to the Softswitch 'c' This OK message will include new SDP information indicating that the Softswitch 'c' can now accept media content on behalf of the second subscriber device and also includes addressing information for where the media content should be sent to i.e. an address of the Softswitch which is allocated to the call. The status of the second subscriber device 'e' is updated in the desktop assistant accordingly. This may result in a further visual change on the screen of the first subscriber device showing that the call has been answered. The further ringing tone which may be produced by the sound module on the first subscriber equipment 'd,' will also be terminated. In this example, the signaling path therefore runs from the calling party telephone 'a' to Softswitch 'c' via the calling party telephone company hardware 'b' (in this example located in the PSTN), then to the desktop assistant in the first subscriber device 'd' and back to the Softswitch 'c' via the Internet and then to the second subscriber device 'e' via the PSTN and back again to the Softswitch 'c' This doubling back of the signaling path is known as tromboning.

The Softswitch now knows that media content in the form of voice data for the call can now be routed directly to and from the second subscriber device 'e.' The Softswitch 'c' sends 't' this information on to the hardware 'b' of the calling party's telephone company. Two-way exchange of media content then occurs 'x' as voice media content flows from the calling party to the subscriber and vice versa 'u.' During the two-way flow of voice media content, the first subscriber device is not in the media path, but does remain in the signaling path.

In an alternative scenario, the subscriber may already be using the second subscriber device 'e' to conduct a telephone call with somebody else when calling party 'a' attempts to call the subscriber. In this case the second subscriber device 'e' will send back an engaged signal to the Softswitch 'c' instead of a ringing signal. The media content sent back to the calling party by the Softswitch will be in the form of the well-known "engaged" sound, which when received by the calling party indicates that the subscriber's telephone is currently being used for another call i.e. the subscriber's telephone is engaged. This played back media content is known as an engaged tone since it indicates that the called party telephone is currently engaged.

Figure 3:
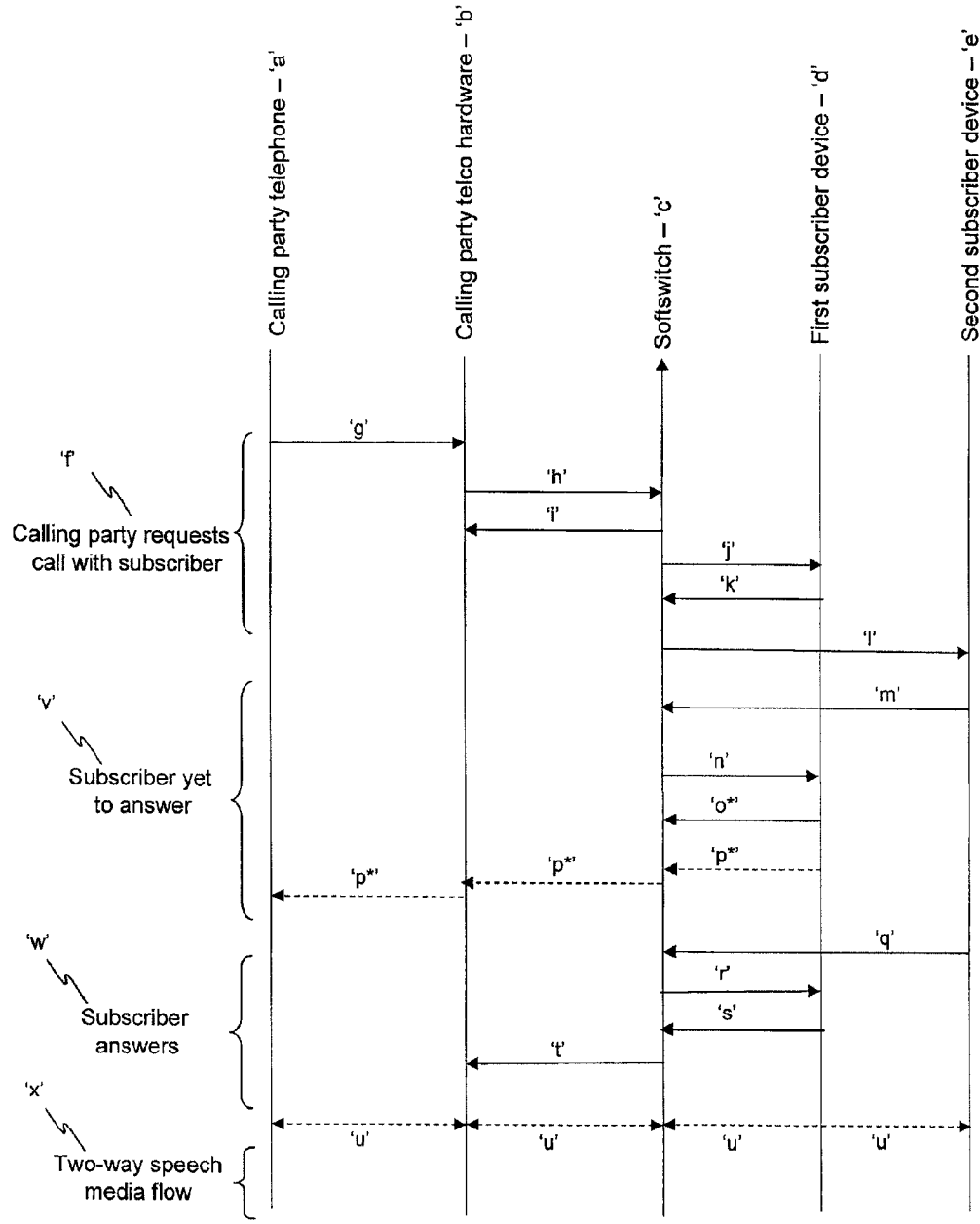
FIG. 3 is a diagram showing the media and signaling flows involved in the provision of subscriber equipment-originated customized prior-to-answer telephony services according to an embodiment of the invention.

The above description involves a Softswitch located in the network providing standard engaged and ringback tones to calling parties prior to the call being answered. The media content relating to the standard engaged and ringback tones is stored in the network, for example in memory provided in the Softswitch itself. Provision of customized subscriber equipment-originated prior-to-answer telephony services is now described for the example of a telephone call initiated by a calling party to a subscriber, with reference to FIG. 3 showing the media and signaling flows involved.

Here the media content is stored in memory local to the subscriber in the first subscriber device, for example on the hard-disk of a PC. The stored media content could be stored for example in the Motion-Pictures Expert Group Layer 3 format (*.mp3). When the media content is to be played back it is converted by the desktop assistant into a data format suitable for streaming, for example according to the Real-Time Transport Protocol (RTP). The subscriber can therefore customize their prior-to-answer telephony services and allocate media content to be played back when people call. When a particular calling party calls and before the subscriber answers, the calling party will be played back media content previously allocated to them by the subscriber. Different media content may be played back according to the context of the call, depending for example on calling party identity, time of day etc. The media content may even be different for ringback and engaged scenarios for the same calling party.

The media content may be downloaded via the internet by the subscriber, the only limit on the media content available to the subscriber for the customization being the amount of local storage space on the subscriber PC hard-disk. Downloading and organization of the media content can be carried out using the desktop assistant in the first subscriber device, with a GUI facilitating the process. The process begins in a similar manner as for the provision of non-customized network-originated prior-to answer services described above. A call requests begins 'f when the calling party picks up their telephone 'a' and dials the telephone dialing number associated with the subscriber i.e. that of the second subscriber device 'e.' A call request 'g' is sent from the calling party's telephone 'a' to the hardware 'b' of the telephone company responsible for their calls.

As before, a lookup service is employed to find out where to route the call to. Using the information provided by the lookup service, the call request from the calling party is routed 'h' to the Softswitch controlled by the subscriber's telephone company. The Softswitch 'c' sends the call request on to the desktop assistant in the first subscriber device 'd' in the form of an invite request 'j.' A trying signal 'i' is sent by the Softswitch 'c' back to the telephone company hardware 'b' of the calling party to indicate that an attempt is being made to establish the call. When the desktop assistant in the first subscriber device receives the invite request, it sends an invite message 'k' back to the Softswitch 'c' This invite message 'k' contains the same information as the invite message 'j,' so that the SDP information in invite message 'j' has effectively been passed back to the Softswitch unaltered. This invite message 'k' also indicates, using the Session Description Protocol (SDP), that the Softswitch should not be sending any media content to the desktop assistant in the first subscriber device. The Softswitch then sends an incoming call notification signal T direct to the second subscriber device 'e' using these identification details. When the second subscriber device 'e' receives the notification signal it rings and sends a ringing signal 'm' back to the Softswitch 'c' The Softswitch 'c' then conveys this information to the desktop assistant in the first subscriber device 'd' in a ringing message 'n.' The desktop assistant in the first subscriber device 'd' then updates the status of the second subscriber device accordingly. As above, this may result in a visual change on the screen of the first subscriber device informing the subscriber that there is an incoming call. Similarly, a further ringing tone may also be produced by a sound module on the first subscriber device 'd,' which is in addition to the ringing tone emitted from the second subscriber device 'e.' As above, the signaling path has doubled back between the Softswitch and first and second subscriber devices, using a tromboning signaling path. Instead of the desktop assistant in the first subscriber device 'd' routing a ringing message back to the Softswitch 'c' as above though, the desktop assistant in the first subscriber device 'd' routes an early media message O*' back to the Softswitch 'c' In SIP, an early media message such as this is known as a "183 Early Media" message. The early media message O*' indicates to the Softswitch that the subscriber's telephone has not yet been answered 'v' by the subscriber. The early media message also indicates using SDP, that the Softswitch should not be sending media content to the desktop assistant in the first subscriber device. The early media message O*' further indicates to the Softswitch that the desktop assistant in the first subscriber device 'd' itself will be sending media content that should be forwarded on to the telephone 'a' of the calling party. The first subscriber device 'd' then proceeds to transmit media content 'p*' back to the telephone of the calling party 'a', via the Softswitch 'c' and calling party telephone hardware 'b.' Instead of this transmitted (played back) media content data being in the form of the well-known telephone "ringing" sound, however, the media content data 'p*' has been customized by the subscriber for that particular calling party and originates from the desktop assistant in the first subscriber device 'd.' This played back media content data is a customized ringback tone and can be dependent on the calling context.

When the subscriber answers the call 'w,' the second subscriber device 'e' sends an answer signal 'q' to the Softswitch 'c' The Softswitch 'c' then sends an OK message 'r' to the desktop assistant in the first subscriber device 'd' informing it that the subscriber has answered the call. In SIP, this is a "200 OK" message. The desktop assistant in the first subscriber device then acknowledges this in an OK message 's' back to the Softswitch 'c' This OK message will include new SDP information indicating that the Softswitch 'c' can now accept media content on behalf of the second subscriber device and also includes addressing information for where the media content should be sent to i.e. an address of the Softswitch which is allocated to the call. The status of the second subscriber device 'e' is updated in the application software running on the first subscriber device 'd' accordingly. This may result in a further visual change on the screen of the first subscriber device showing that the call has been answered. The further ringing tone produced by the sound module on the first subscriber device 'd,' will also be terminated. The Softswitch 'c' sends an OK signal 't' on to the hardware 'b' of the calling party's telephone company. Two-way exchange of media content 'x' then occurs as voice media content flows from the calling party to the subscriber and vice versa 'u.'

The played back media content may include voice announcement content in the form of a prerecorded voice message. The voice announcement functionality is also customizable by the subscriber and may be combined with ringback or engaged tone content, for example using rules created by the subscriber. This voice announcement content may for example be an out of office message, a do not disturb message or a message saying that the call will now be diverted to the subscriber's mobile telephone. The voice announcement content may be interactive, such that the calling party could for example press 'key 1' to leave a message, press 'key 2' to hear a ringback tone while they wait for the call to be answered or press 'key 3' to hear a different ringback tone whilst waiting. The played back media content could also be changed according to the date and/or time context of the call, for example offering more relaxed ringback tones late at night.

To avoid the need for a microphone on the first subscriber device for recording voice announcement content, the first and second subscriber devices could be used in conjunction. The desktop assistant in the first subscriber device could be employed to 'call' the second subscriber device via the Softswitch, making it ring. The subscriber could then answer the 'call' and record an announcement by speaking into the second subscriber device, which has a built-in microphone. This voice message is then transmitted via the Softswitch to the first subscriber device where it is recorded and stored by the desktop assistant for use as a voice announcement. If the Softswitch cannot contact the second subscriber device for some reason, either because the second subscriber device is turned off or the data network is down, the customized media content could fall back to a network-originated prior-to-answer service. This could, for example be the provision of the standard ringback and/or engaged tones or providing a limited set of customized tones from the Softswitch itself.

The above description has focused on customized prior-to-answer telephony services. The invention also provides other customized media playback services where the played back media is dependent on a call state of the second subscriber device. Thus, these customized media playback services may be provided in prior- or post-answer call states. The Softswitch knows the call state of the second subscriber device as all signaling to and from the second subscriber device passes via the Softswitch. The Softswitch is thus able to pass this call state information on to the first subscriber device. The first subscriber device can then initiate playback of customized media content depending on the call state.

If the second subscriber device is ringing i.e. the subscriber has yet to answer the call, the call state is a ringing state and the first subscriber device receives signaling information indicating that state. Here the calling party can be played back customized ringback tone content to indicate to the calling party that the second subscriber device is ringing. If the second subscriber device is currently being used for a call, i.e. it is engaged, the call state is an engaged state and the first subscriber device receives signaling information indicating that state. Here the calling party can be played back customized engaged tone content to indicate to the calling party that the second subscriber device is engaged.

If the second subscriber device is currently being used for a call and another calling party calls, if the called subscriber has a call waiting service active, the call state is an engaged (with call waiting being indicated) state and the first subscriber device receives signaling information indicating that state. Here the calling party can be played back customized engaged (with call waiting being indicated) content to indicate to the calling party that the second subscriber device is engaged, but that the subscriber (or whoever is using the second subscriber device to conduct a call) is being alerted that another call is incoming.

Figure 4:
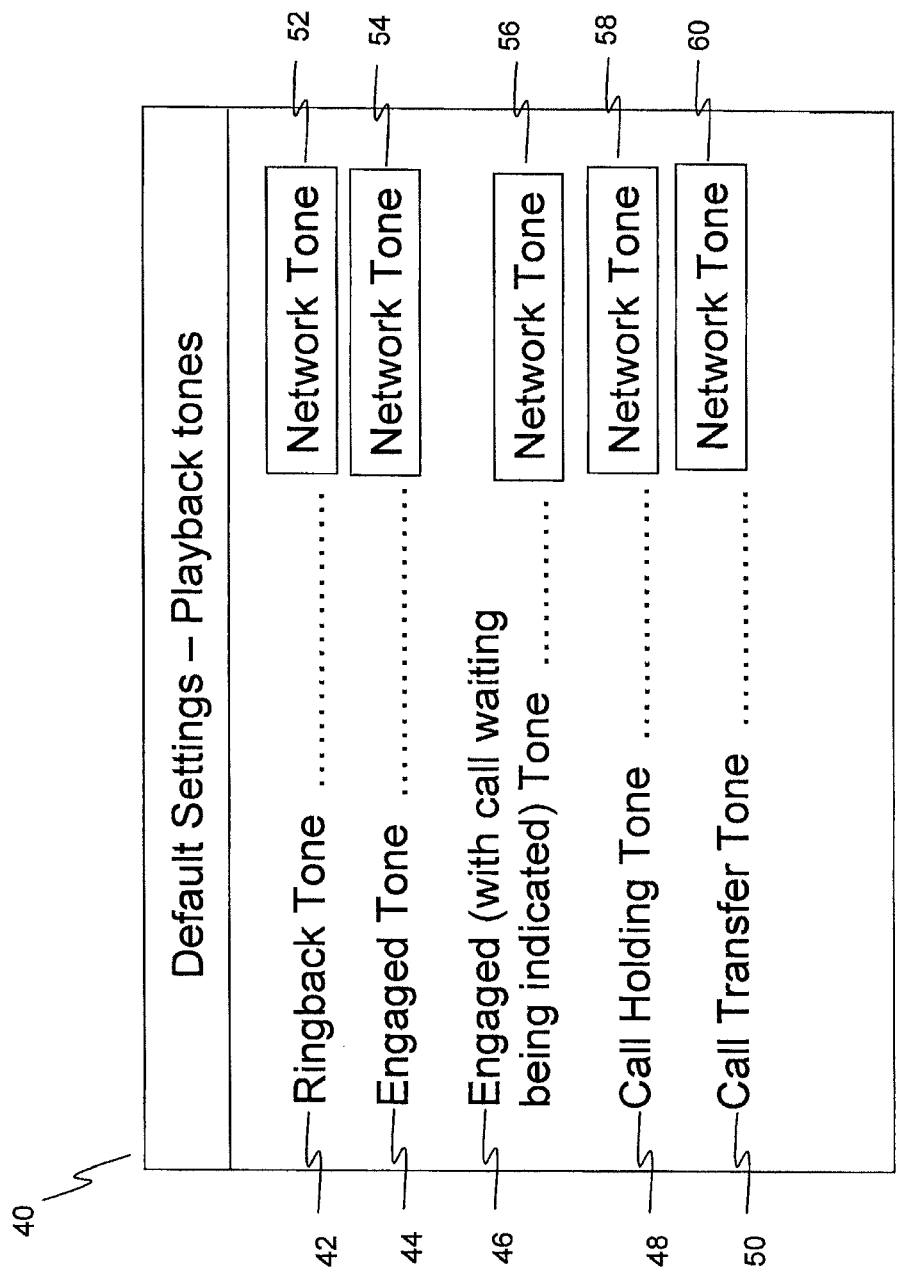
FIG. 4 is an example GUI screen showing default settings for a customizable media playback service according to an embodiment of the invention.

If the second subscriber device is currently being used for a call, another calling party calls and the subscriber chooses to put one of the parties on hold, the call state is a call holding state and the first subscriber device receives signaling information indicating that state. Here the party on hold can be played back customized call holding content to indicate to the party on hold that the second subscriber device is being used to conduct another call and that they are on hold. If the second subscriber device is currently being used for a call and the subscriber chooses to transfer the call, the call state is a call transfer state and the first subscriber device receives signaling information indicating that state. Here the calling party can be played back customized call transfer content to indicate to the calling party that they are being transferred. A subscriber may customize their telephony services such that different items of media content can be played back for different call states. This customization may be different for different calling parties. FIG. 4 is an example GUI screen showing default settings 40 for a customizable media playback service according to the invention. These are the settings that would be applied before a subscriber has customized their services.

The ringback tone 42 default setting can be seen to be the standard network tone 52. The engaged tone 44 default setting can be seen to be the standard network engaged tone 54. The engaged (with call waiting being indicated) tone 46 default setting can be seen to be the standard network engaged (with call waiting being indicated) tone 56. The call holding tone 48 default setting can be seen to be the standard network call holding tone 58. The call transfer tone 50 default setting can be seen to be the standard network tone 60. These tones are all originated from the Softswitch in response to receiving signaling information from the second subscriber device.

Figure 5:
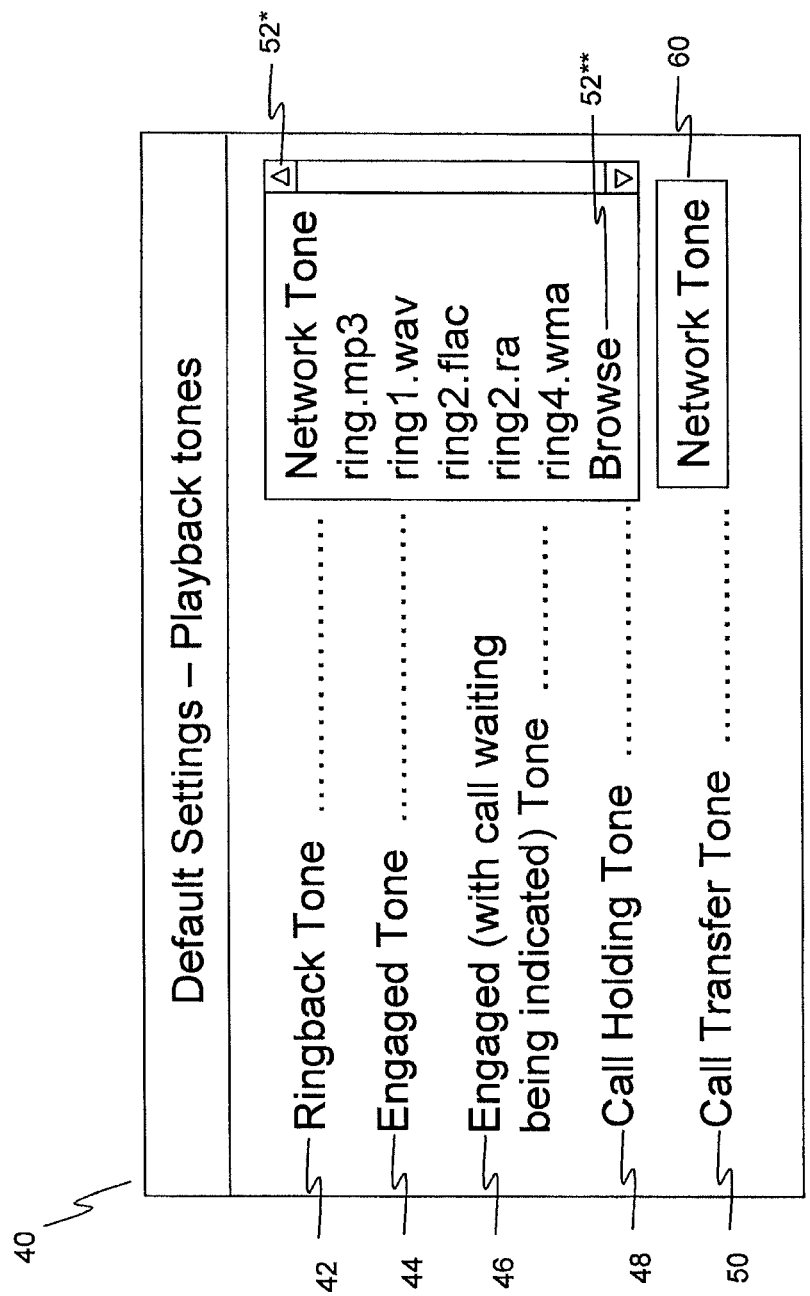
FIG. 5 is an example GUI screen showing customization of a default ringback tone setting for a media playback service according to an embodiment of the invention.
Figure 6:
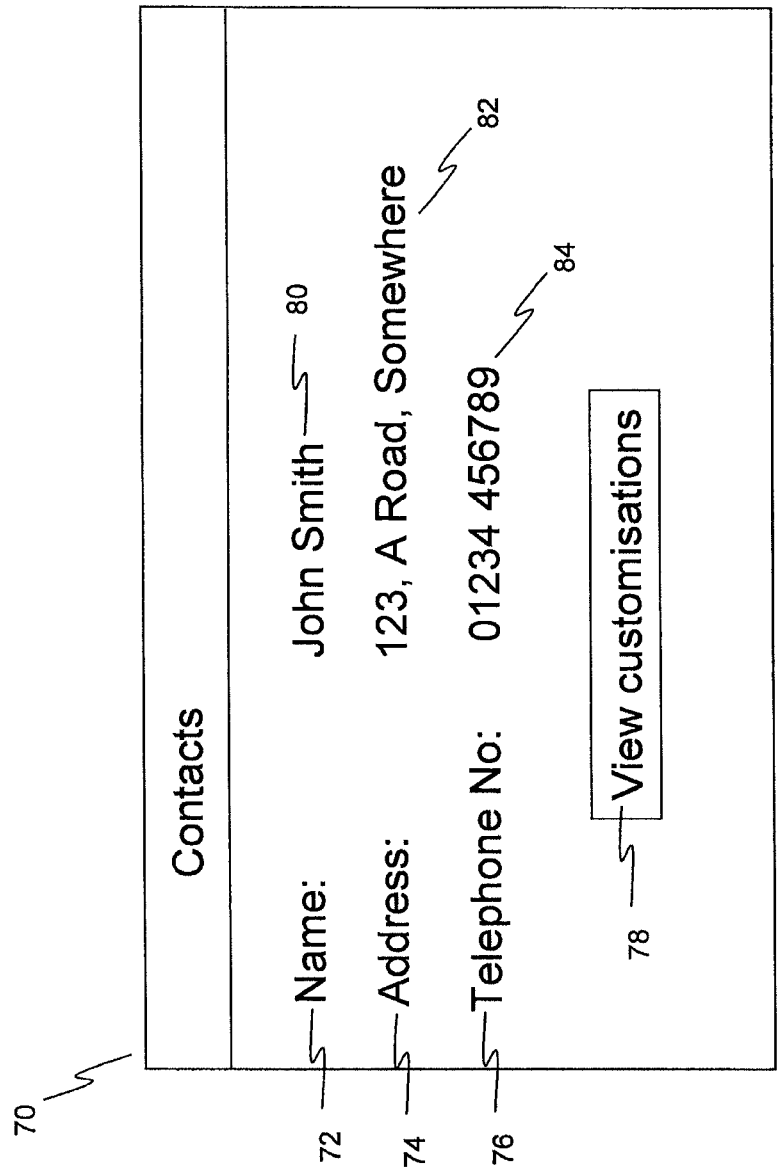
FIG. 6 is an example GUI screen showing a contacts entry according to an embodiment of the invention.

FIG. 5 is an example GUI screen showing customization of the default ringback tone setting 42 for a media playback service according to the invention. Many of the elements in FIG. 5 are in common with FIG. 4. However, upon clicking on box 52, with a mouse or other such input device, which relates to the default ringback tone, a drop down menu 52* appears. The drop down menu 52* gives a choice of several alternatives that the subscriber can scroll down and click on to set their ringback tone, for example ring.mp3, ring1.wav etc., or browse 52** to other locations on the subscriber equipment. Once the subscriber has set a customized tone up, the desktop assistant initiates the playback of the appropriate media content, including converting the stored data format to the playback data format, on receiving the appropriate signaling information. FIG. 6 is an example GUI screen showing a contacts entry 70 according to the invention. This shows some example details that the subscriber may keep for each of their contacts. In this case the contact's name 72 is "John Smith" 80, his address 74 is "123, A Road, Somewhere" 82 and his telephone number 76 is "01234 456789" 84. The subscriber is able to view the customized tones for John Smith by clicking on the "View customizations" button 78.

Figure 7:
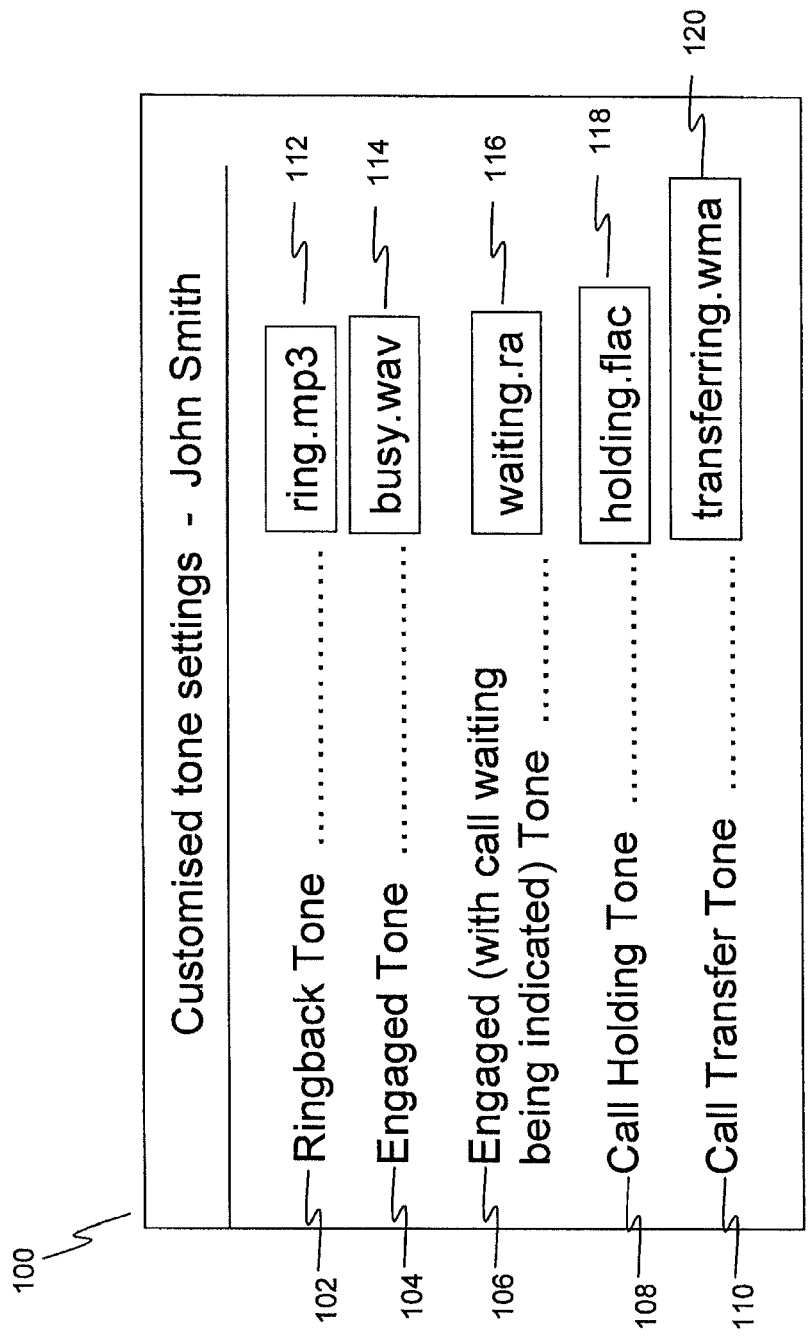
FIG. 7 is an example GUI screen showing customized tone settings for a contacts entry according to an embodiment of the invention.

FIG. 7 is an example GUI screen showing customized tone settings for contacts entry John Smith 100 according to the invention. These settings will override the default and customized settings as described above, if John Smith is the calling party. The customized ringback tone 102 for John Smith can be seen to be "ring.mp3" 112. The customized engaged tone 104 for John Smith can be seen to be "busy.wav" 114. The customized engaged (with call waiting being indicated) tone 106 for John Smith can be seen to be "waiting.ra" 116. The call holding tone 108 for John Smith can be seen to be "holding. fiac" 118. The call transfer tone 110 for John Smith can be seen to be "transferring.wma" 120. To edit a customized tone, the subscriber can click on one of buttons 112, 114, 116, 118 or 120 upon which they can browse (not shown) to the relevant file stored in their own subscriber equipment, select and save the desired settings. The above embodiments are to be understood as illustrative examples of the invention. Further embodiments of the invention are envisaged.

It is envisaged that the present invention could be applied to the area of mobile telephony, so instead of the second subscriber device being a fixed-line telephone the subscriber may have a mobile station. The telephony services could then be provided via a cellular radio mobile network. The first and second subscriber devices could be combined into a single endpoint. The subscriber equipment could then comprise a VoIP telephone associated with a desktop assistant running on a PC. Alternatively, the subscriber equipment could be integrated into one device, for example a mobile phone with an integrated 'mobile assistant.'

The data network could for example be accessed via a wireless local area network (WLAN) or integrated into the telephone signaling network itself. The above discussion describes the present invention using the SIP signaling protocol. The present invention is equally applicable to other packet based protocols such as the popular H.323 protocol administered by the ITU-T, or the Skype™ system. As protocols for the Internet are constantly evolving, it is envisaged that the present invention would be compatible with the next and beyond generations of such protocols. The played back media content should not be limited to audio data, as the present invention could be used to provide customized video playback to callers making calls from telephones with video functionality.

The data formats for stored items of media content may include one or more of the following formats, or variants thereof: RealAudio™ (*.ra, *.ram), Waveform Audio (*.wav), Motion Pictures Expert Group (*.mpeg, *. mp3), Free Lossless Audio Codec (*.flac), Data Transformation Services (*.dts), Windows Media Audio File (*.wma), Advanced Audio coding, (*.aac), Audio Video Interleave file (*.avi), QuickTime Movie File Extension (*.mov), Advanced Streaming Format (*.asf). Protocols for played back media content may include one or more of the following, or variants thereof: Digital Video Broadcasting (DVB), Real-Time Transport Protocol (RTP), Video stream for transport using RTP (H.261), Bitstream in the RTP (H.263), RTP Control protocol (RTCP), User Datagram Protocol (UDP).

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of providing customized prior-to-answer services in a telephony service using the Session Initiation Protocol (SIP), the method comprising:
    receiving SIP signaling information relating to a first incoming call directed to a subscriber from a calling party, the first incoming call being directed to the subscriber from the calling party via a network-based telephony switching node which is capable of generating default media content to be transmitted to the calling party prior to the first incoming call being answered;
    transmitting, from subscriber equipment associated with the subscriber to the network-based telephony switching node, a SIP signaling message indicating that the network-based telephony switching node should not be sending default media content to the calling party prior to the first incoming call being answered, and further indicating that media content is to be transmitted from the subscriber equipment to the calling party prior to the first incoming call being answered; and
    after the SIP signaling message is transmitted, sending the media content from the subscriber equipment associated with the subscriber to the network-based telephony switch in order to begin playback of an item of media content to the calling party while the first incoming call is in a prior-to-answer signaling state,
    wherein the item of media content is stored in the subscriber equipment,
    wherein the item of media content comprises media content customized by the subscriber,
    wherein the customized media content is different from the default media content, wherein the subscriber equipment is located at a subscriber location,
    wherein the playback is originated from the subscriber equipment.

2. The method of claim 1, wherein the received signaling information comprises an incoming call request, the method further comprising:
    transmitting an incoming call request onward from the subscriber equipment;
    receiving a ringing indication at the subscriber equipment in response to the transmission; and
    beginning the playback in response to receiving the ringing indication.

3. The method of claim 1, further comprising:
    receiving signaling information relating to a further incoming call directed to the subscriber from a further calling party;
    beginning playback of a further item of media content to the further calling party before the further incoming call is answered,
    wherein the further item of media content is stored in the subscriber equipment, and the playback of the further item of media content is originated from the subscriber equipment.

4. The method of claim 1, the method further comprising: selecting an item of media content to play back to a calling party, the selection being dependent on a context related to an incoming call.

5. The method of claim 4, wherein the context comprises one or more of an identity of the calling party, a time at which the incoming call occurs, a location of the subscriber, and a location of the calling party.

6. The method of claim 1, further comprising terminating the playback of an item of media content when the subscriber answers an incoming call.

7. The method of claim 1, wherein the subscriber equipment comprises a first subscriber device and a second subscriber device, and wherein the first subscriber device stores the item or items of media content and the second subscriber device is used to answer the incoming call.

8. The method of claim 7, wherein the second subscriber device comprises a telephone connected to the telephony service network.

9. The method of claim 8, wherein the telephone is an analog telephone.

10. The method of claim 8, wherein the telephone is a packet-switched telephone.

11. The method of claim 7, wherein the first subscriber device is connected to a data network.

12. The method of claim 1, wherein playback of an item of media content comprises ringback tone content.

13. The method of claim 12, further comprising:
receiving signaling information including a ringing signal indicating that a telephony
device is alerting the subscriber to an incoming call, and playing back the ringback tone content in response thereto.

14. The method of claim 1, wherein playback of an item of media content comprises engaged tone content.

15. The method of claim 14, further comprising:
receiving signaling information including an engaged signal indicating that a telephony device is currently involved in a call; and
playing back the engaged tone content in response thereto.

16. The method of claim 1, wherein playback of the item of media content includes audio music content.

17. The method of claim 1, wherein playback of the item of media content comprises voice announcement content.

18. The method of claim 17, wherein the voice announcement content is recorded using the second subscriber device.

19. The method of claim 1, further comprising:
receiving input from the calling party;
in response to the received input, selecting another item of media content; and
beginning playback of the another item of media content, wherein the another item of media content is stored in the subscriber equipment and the playback is originated from the subscriber equipment.

20. The method of claim 1, wherein the subscriber equipment comprises a Graphical User Interface for managing the items of media content to be played back.

21. The method of claim 1, wherein the subscriber equipment comprises one of a personal computer, a laptop, a mobile telephone, a personal digital assistant and/or an audio playback device.

22. The method of claim 1, wherein playback of the item of media content involves streaming the item of media content over a data network.

23. The method of claim 1, wherein playback of the item of media content comprises transmitting the item of media content according to the Real-time Transfer Protocol.

24. The method of claim 1, wherein the telephony service comprises a packet based telephony service.

25. The method of claim 24, wherein the packet-based telephony service comprises a Voice over Internet Protocol (VoIP) service.

26. The method of claim 1, wherein the telephony service comprises a public switched telephone network (PSTN) telephony service.

27. The method of claim 1, wherein the telephony service comprises a mobile telephony service.

28. The method of claim 1, wherein the playback comprises receiving the item of media content in a first data format, converting the format of the item of media content from the first data format to a second data format, and playing back the item of media content in the second data format.

29. A method for providing customized media playback services in a telephony service using a first subscriber device located at a subscriber location, the telephony service further including a second subscriber device located at the subscriber location, the second subscriber device having a telephone functionality allowing the second subscriber device to conduct a telephone call, the second subscriber device also having call states controlled by a networked-based telephony switching node, the method comprising:
receiving signaling information from the network-based telephony switching node at the first subscriber device, the signaling information indicative of a call state at the second subscriber device; and
in response to receiving the signaling information, initiating playback of an item of media content from the first subscriber device to a calling party while a call is in a prior to answer signaling state,
wherein the item of media content is stored in a media store located at the subscriber location and the playback is initiated from the first subscriber device.

30. The method of claim 29, wherein the indicated call state is a ringing state and the playback comprises ringback tone content.

31. The method of claim 29, wherein the indicated call state is an engaged state and the playback comprises engaged tone content.

32. The method of claim 29, wherein the indicated call state is an engaged (with call waiting being indicated) state and the playback comprises engaged (with call waiting being indicated) tone content.

33. The method of claim 29, wherein the indicated call state is a call holding state and the playback comprises call holding tone content.

34. The method of claim 29, wherein the indicated call state is a call transfer state and the playback comprises call transfer tone content.

35. An apparatus configured to perform the method of claim 1.

36. Subscriber equipment for use in providing customized prior-to-answer services in a telephony service using the Session Initiation Protocol (SIP), the subscriber equipment being located at the subscriber location and configured to:
store an item of media content;
receive SIP signaling information relating to a first incoming call directed to a subscriber from a calling party;
transmit a SIP message indicating that the network-based telephony switching node should not be sending default media content to the calling party prior to the first incoming call being answered, and further indicating that media content is to be transmitted from the subscriber equipment to the calling party prior to the incoming call being answered; and
after the SIP signaling message is transmitted, sending the media content from the subscriber equipment associated with the subscriber to the network-based telephony switch in order to begin playback of the item of media content to the calling party while the call is in a prior-to-answer signaling state,
wherein the playback is originated from the subscriber equipment.

37. A computer program product comprising a non-transitory computer-readable medium having computer readable instructions recorded thereon for use in providing customized prior-to-answer services in a telephony service using the Session Initiation Protocol (SIP), the computer readable instructions being operative, when performed by a computerized device, to cause the computerized device to:
receive SIP signaling information relating to a first incoming call directed to a subscriber from a calling party;
transmit a SIP signaling message indicating that the network-based telephony switching node should not be sending default media content to the calling party prior to the first incoming call being answered, and further indicating that media content is to be transmitted from subscriber equipment to the calling party prior to the incoming call being answered; and
after the SIP signaling message is transmitted, sending the media content from the subscriber equipment associated with the subscriber to the network-based telephony switch in order to begin playback of an item of media content to the calling party while the call is in a prior-to-answer signaling state,
wherein the item of media content is stored in the subscriber equipment,
wherein the subscriber equipment is located at the subscriber location, wherein the subscriber equipment is associated with the subscriber, and wherein the playback is originated form the subscriber equipment.

38. A computer program product comprising a non-transitory computer-readable medium having computer readable instructions recorded thereon for use in providing customized media playback services in a telephony service using a first subscriber device located at a subscriber location, the telephony service involving a second subscriber device located at the subscriber location, the second subscriber device including telephone functionality allowing the second subscriber device to conduct a telephone call, the second subscriber device having call states controlled by a network-based telephony switching node, the computer readable instructions being operative, when performed by a computerized device, to cause the computerized device to:

receive signaling information from the network-based telephony switching node at the first subscriber device, the signaling information indicating a call state at the second subscriber device; and in response to the reception of signaling information, initiate playback of an item of media content from the first subscriber device to a calling party while a call is in a prior to answer signaling state, wherein the item of media content is stored in a media store located at the subscriber location and the playback is initiated from the first subscriber device.

39. An apparatus configured to perform the method of claim 29.

40. The method of claim 1, wherein the network-based telephony switching node is responsible for routing calls to and from the subscriber.

41. The method of claim 1, wherein the SIP signaling message further indicates that the network-based telephony switching node should not send default media content to the subscriber equipment while the first incoming call is in a prior-to-answer signaling state.

* * * * *